United States Patent [19]

Rossi

[11] 4,412,422
[45] Nov. 1, 1983

[54] APPARATUS AND METHOD FOR CONTROLLING A MULTI-TURBINE INSTALLATION

[75] Inventor: Anthony J. Rossi, Leominster, Mass.
[73] Assignee: General Electric Company, Lynn, Mass.
[21] Appl. No.: 298,272
[22] Filed: Aug. 31, 1981
[51] Int. Cl.³ .................................... F01B 21/00
[52] U.S. Cl. .............................. 60/706; 60/702; 60/711; 60/719
[58] Field of Search ............... 60/698, 702, 706, 711, 60/719

[56] References Cited

U.S. PATENT DOCUMENTS

| | | | |
|---|---|---|---|
| 1,937,349 | 11/1933 | Kieser | 60/719 X |
| 3,812,377 | 5/1974 | Malone | 60/719 X |
| 4,137,721 | 2/1979 | Glennon et al. | 60/711 |

Primary Examiner—Allen M. Ostrager
Attorney, Agent, or Firm—James W. Mitchell

[57] ABSTRACT

The invention is practiced by providing a plurality of turbine-driven systems each producing an output proportional to a respective control signal, means for generating a respective first output signal for each of the turbine-driven systems proportional to a respective first system-output indicating parameter, means for generating a respective error signal for each of the turbine-driven systems proportional to any deviation of a respective second system-output indicating parameter from a respective complementary portion of the combined second system-output parameters of the systems, and means for generating the respective control signal of each of said turbine-driven systems and proportional to any deviations of respective ones of the first output signal and the error signal from a respective predetermined reference value of said first parameter, whereby a predetermined relationship of the individual outputs of the turbine-driven systems is maintained. The invention further comprises a logic controlled switching means effective for determining the number of the turbine-driven systems within the plurality included for sharing combined outputs, electrically connecting each included turbine-driven system to the control apparatus, and electrically isolating each of those turbine-driven systems to be excluded therefrom.

8 Claims, 8 Drawing Figures

APPARATUS AND METHOD FOR CONTROLLING A MULTI-TURBINE INSTALLATION

BACKGROUND OF THE INVENTION

This invention relates to an apparatus and method for controlling a multi-turbine installation. More specifically, the invention relates to controlling a plurality of turbine-driven systems, the combined output of which is predeterminedly apportioned between each of the contributing systems.

While not limited thereto, this invention has particular utility when utilized in conjunction with prime movers such as mechanical drive steam turbines. Mechanical drive turbines are used in industrial and utility applications for driving electrical generators, compressors, pumps and various other types of driven equipment, in combinations generally termed turbine-driven systems.

In one application, a mechanical drive turbine is connected to a feedpump for providing feedwater flow to a boiler. The boiler heats the feedwater to generate steam to power a power plant. In power plants having a relatively large boiler, several feedwater pumps may be required to meet the total feedwater requirement of the boiler. Each of these feedwater pumps is independently powered by a respective mechanical drive turbine. Such turbine-driven systems may be identically rated units operated for equally sharing a total system output requirement or they may be differently sized units having various capacity ratings and operated for proportionately sharing the total system output requirement. In each situation, however, it is desirable that a predetermined relationship of the individual outputs of the turbine-driven systems be maintained. Accordingly, apparatus that will provide for coordinating the operation of these independent turbine-driven systems for effecting load-sharing is necessary. One advantage of using such an apparatus is its effectiveness for subjecting the turbine-driven systems to equal wear at the point of going to overhaul in order not to have one wear out short of its rated time between overhauls. Each turbine-driven system should desirably produce a respective proportionate share of its rate capacity for equalizing wear.

In the application of a turbine-driven pump, the pump output flow is proportional to the rotor speed of the turbine. Electrical control systems for controlling rotor speed, and thereby pump output, by comparing actual speeds with reference signals in a closed loop are known in the art. Solid-state operational amplifiers have been used to provide the various desired functions in the form of electrical signals and the resulting amplified electrical signals have been used to operate servo-valves which, in turn, actuate hydraulic valve positioning rams to control the admission of steam to the turbines for controlling the speed thereof.

The customary method of adjusting turbine speeds for a plurality of turbines is to initially preset the respective reference rotor speeds for each turbine. However, due to physical tolerances in the turbines' feedpumps and piping systems, the output flow of each feedpump may be different even though turbine speeds are identical. In addition, physical tolerances may vary over the entire range of operation. During operation, external control means, not part of the present invention, determines the respective reference speeds for effecting a desired total combined system or installation output. Due to the fact that the relationship of system, or pump, output to rotor speed may change with time and operating conditions, it is difficult to accurately control the outputs of individual systems by controlling rotor speed alone. Accordingly, the systems must each be operated at below full rated output capacity to avoid the possibility of exceeding the rated output capacity of, or overloading, any of the turbine-driven equipment.

SUMMARY OF THE INVENTION

Accordingly, it is an object of this invention to provide a new and improved control apparatus and method for a multi-turbine installation having a plurality of coordinated independent turbine-driven systems each contributing an output to meet a total system requirement.

Another object of this invention is to maintain in the referenced control apparatus and method a predetermined relationship of the individual outputs of the multi-turbine installation.

Another object of this invention is to provide a new and improved means and method effective for enabling equal wear of the turbine-driven equipment of a multi-turbine installation.

Another object of this invention is to provide a new and improved means and method of operating a plurality of turbine-driven systems at full rated output without overloading.

Another object of this invention is to provide a new and improved means and method for automatically determining which of the plurality of turbine-driven systems in a multi-turbine installation are to be included in load-sharing.

Another object of this invention is to provide a new and improved control apparatus including means for effecting compensation of control signal steady state and transient dynamic characteristics in order to provide stable operation.

Briefly stated, the invention is practiced by providing a plurality of turbine-driven systems each producing an output proportional to a respective control signal, means for generating a respective first output signal for each of the turbine-driven systems proportional to a respective first system-output indicating parameter, means for generating a respective error signal for each of the turbine-driven systems proportional to any deviation of a respective second system-output indicating parameter from a respective complementary portion of the combined second system-output parameters of the systems, and means for generating the respective control signal for each of said turbine-driven systems and proportional to any deviations of respective ones of the first output signal and the error signal from a respective predetermined reference value of said first parameter, whereby a predetermined relationship of the individual outputs of the turbine-driven systems is maintained.

The invention further comprises a logic controlled switching means effective for determining the number of the turbine-driven systems within the plurality included for sharing combined outputs, electrically connecting each included turbine-driven system to the control apparatus, and electrically isolating each of those turbine-driven systems to be excluded therefrom.

A particular embodiment of the invention comprises turbine-driven pumps, each having a pump output flow proportional to turbine rotor speed and controlled by a respective control valve separately positioned by a closed-loop electrohydraulic servo means in accordance with the electric control signal. A speed reference signal, which may be a voltage adjustable in value, is algebraically added in a first summing junction with a turbine speed feedback signal representing actual speed of the turbine to provide a speed error signal which is supplied to the control mechanism of the valve for controlling the turbine speed. Output signals representing the actual pump output flow of respective pumps are algebraically added in a summing junction for providing an indication of combined system output flow. Each of the output signals is then algebraically added with a respective, scaled, portion of the combined signals for providing respective output error signals. Logic controlled switches, when closed, provide respective connections which allow the sum of a respective output error signal to be added to the speed error signal which results in control of the turbine-driven system for sharing combined output.

DESCRIPTION OF THE DRAWINGS

The invention, together with further objects and advantages thereof, is more particularly described in the following detailed description taken in conjunction with the accompanying drawings in which.

DESCRIPTION OF THE PREFERRED EMBODIMENT

Figure 1:
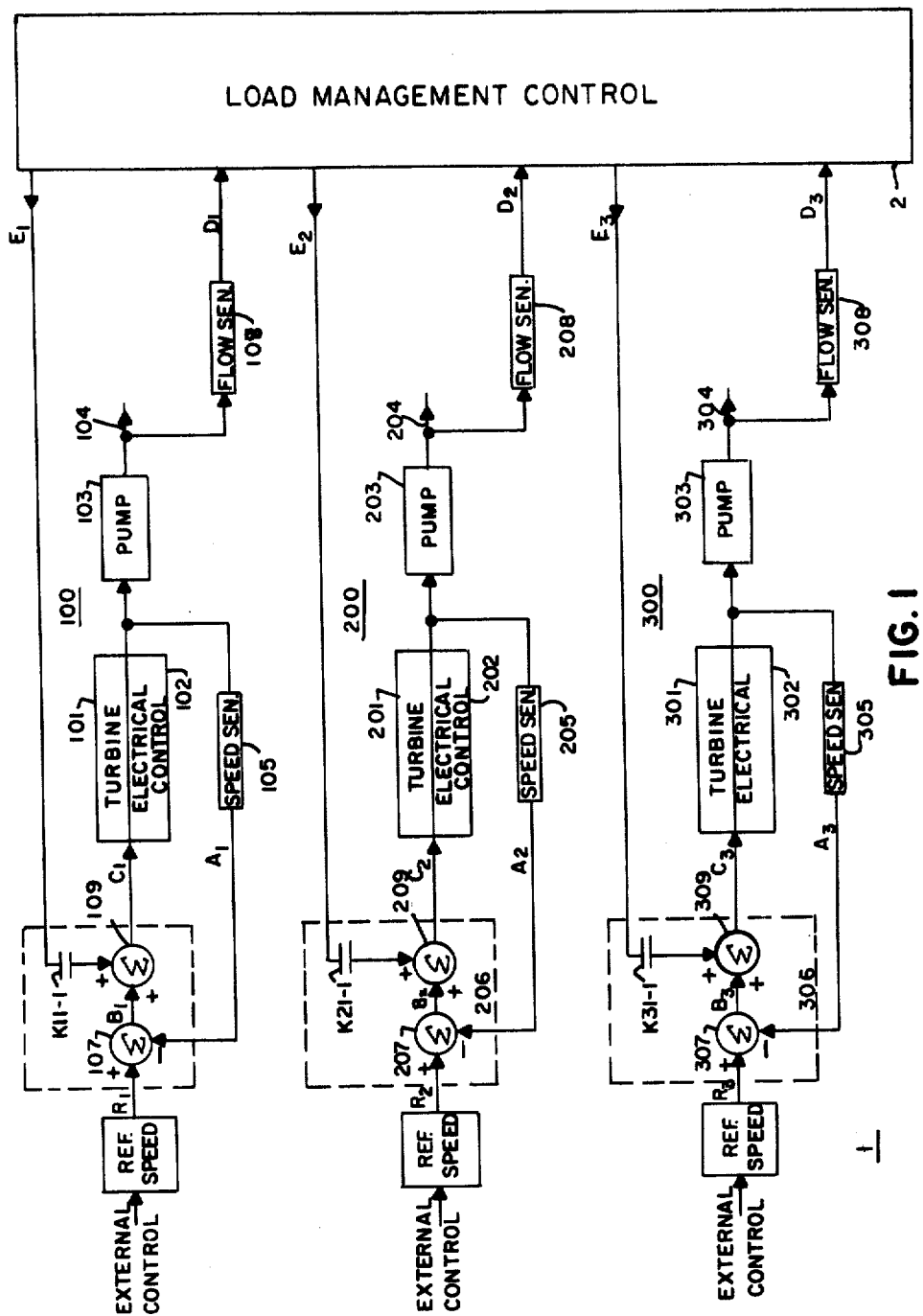
FIG. 1 is an overall schematic block diagram of a multi-turbine installation comprising three turbine-driven pump systems and control apparatus comprising a load management control for coordinating the respective outputs of each.

For convenience of understanding the figures, the following number convention is used. The subscripts 1, 2, and 3 used in identifying electrical signals each indicates the turbine-driven system 100, 200 or 300, respectively, with which such signal is associated. Identical elements of the turbine-driven systems have identical numerical designations except for the first digit thereof, which digit 1, 2, or 3 indicates the turbine-driven system 100, 200, or 300, respectively, with which such element is associated. Furthermore, where appropriate, all element connections contained in the figures are electrical connections effective for carrying electrical signals. All relays and relay contacts in the drawing are shown in a state wherein the relay coils are de-energized such, for example, when an associated turbine-driven system is in a manual control mode or in a trip condition, where no loadsharing is required.

Shown in FIG. 1 is the control apparatus of the present invention as utilized in a multi-turbine installation 1 comprising three equally-rated turbine-driven systems 100, 200, and 300. Such systems comprise steam turbines 101, 201, and 301, each with an associated electrical control 102, 202, and 302, respectively. Each turbine drives a respective load or driven equipment such as a feedwater pump 103, 203, or 303. The feedwater flow outputs 104, 204, and 304, respectively, of the pumps are combined for supplying the total requirement of a boiler (not shown) for generating steam in a power plant. The total boiler requirement represents a total multi-turbine installation load which must be shared by the turbine-driven systems thereof.

The controls 102, 202, and 302 associated with turbines 101, 201, and 301, respectively, are conventional closed-loop control means each comprising a first system-output indicating parameter such as rotor speed. Due to the fact that the turbines drive equipment such as a feedwater pump, the output of which is proportional to the speed of rotation of the turbine rotor connected thereto, rotor speed is indicative of the output of the turbine-driven system or pump.

The total installation load or feedwater requirement is determined by an external control means which is not part of the present invention, and which determines an initial magnitude of feedwater output or load to be contributed by each turbine-driven system. This is accomplished by generating speed reference signals R1, R2, and R3 which control feedwater pump output by controlling turbine rotor speed. Each such feedwater output to be contributed to the total requirement is usually equal; however, other proportions may be established, as will be understood from the following discussion of the control apparatus.

Electrical controls 102, 202, and 302 further comprise first system-output indicating parameter sensors such as speed sensors 105, 205, and 305, respectively. These speed sensors, which can be tachometers, generate speed feedback signals A1, A2, and A3, respectively, each of which is proportional to rotor speed. Speed reference signals R1, R2, and R3 and feedback signals A1, A2, and A3 are applied to summing means 106, 206, and 306 of system 100, 200, and 300, respectively, which means generate control signals C1, C2, and C3, respectively. More specifically, speed reference signals R1, R2, and R3 are applied to first summing junctions 107, 207, and 307 of summing means 106, 206, and 306, respectively, which junctions also receive the feedback signals A1, A2, and A3, respectively. These first summing junctions 107, 207, and 307 algebraically sum respective speed reference and feedback signals which are opposite in polarity for producing first, or speed, error signals B1, B2, and B3, respectively, for controlling turbine speed. Controlling turbine speed by the use of closed-loop control means each having a speed error signal is well known to those skilled in the art and will not be discussed in detail herein except that the speed error signal is utilized by the electrical control associated with each turbine for controlling an electrohydraulic servo-valve (not shown) for admitting steam to the turbine for controlling its speed, and thereby controlling the output of the respective system.

In the situation where the load applied to any one of the turbines, turbine 101 for instance, is increased, the speed thereof tends to decrease thereby causing the voltage of reference signal R1 to dominate the feedback signal A1 thus creating an imbalance at summing junction 107 which produces a positive speed error signal indicating that the servo-valve must be additionally opened for admitting more steam for increasing the speed of the turbine. Conversely, if the load applied to turbine 101 decreases, the speed thereof tends to increase thereby causing the voltage of feed-back signal A1 to dominate reference signal R1, thus creating an imbalance at summing junction 107 which produces a negative speed error signal indicating that the servo-valve must be additionally closed for admitting less steam for decreasing the speed of the turbine. In the situation where the actual rotor speed of a respective turbine is equal to the reference speed thereof, the speed error signal will be zero, indicating that no speed correction is required. Furthermore, the electrical controls associated with turbines 101, 201, and 301 perform essentially as above-mentioned also when the speed reference signals themselves are adjusted upwardly or downwardly for controlling the turbine speeds and therefore the pump outputs.

Although the total installation load can be apportioned between the turbine-driven systems of the installation by the selection of speed reference signals R1, R2, and R3, the relative contribution of each turbine-driven system may not remain fixed due to changes in the system such as can result, for example, from wear and changes in operating conditions.

According to the present invention, a load management control 2 is provided for coordinating the outputs of the cooperating turbine-driven systems for maintaining a predetermined relationship therebetween. The load management control 2 further comprises second system-output indicating parameter sensors for each turbine-driven system such as flow sensors 108, 208, and 308 for generating output signals D1, D2, and D3 proportional to the feedwater flow outputs 104, 204, and 304 of pumps 103, 203, and 303, respectively. Output signals D1, D2, and D3 are combined within the load management control 2 for obtaining a combined signal proportional to the combined turbine-driven system outputs. Scale factors indicative of the predetermined relationships of the individual pump outputs are each individually applied to the combined signal and each resulting signal is combined with a respective output signal D1, D2, and D3, each combination producing a second, or output, error signal E1, E2, and E3, respectively. When the output produced by any one pump is equal to its predetermined relative share of the combined outputs thereof, the output error signal thereof will be zero. When the output produced is greater than its predetermined share, the respective output error signal will be negative in polarity and similarly a lesser output results in an error signal of positive polarity. The load management control 2 simultaneously provides error signals for decreasing the outputs of those systems producing greater than their predetermined shares and for increasing those systems producing less than their predetermined shares.

The error signals E1, E2, and E3 are applied to turbine-driven systems 100, 200, and 300, respectively, through logic-controlled relay contacts K11-1, K21-1, and K31-1, respectively, each of which contacts is normally closed when the respective turbine-driven system is operating. The operation of these switching means will be further described below.

Second summing junctions 109, 209, and 309 in summing means 106, 206, and 306, respectively, algebraically sum speed error signals B1, B2, and B3 with output error signals E1, E2, and E3, respectively, when relay contacts K11-1, K21-1, and K31-1 are closed, for generating the respective control signals C1, C2, and C3. Control signals C1, C2, and C3 are utilized by the electric controls 102, 202, and 302, respectively, for controlling the speed and therefore the output of turbine-driven systems 100, 200, and 300, respectively.

Figure 2:
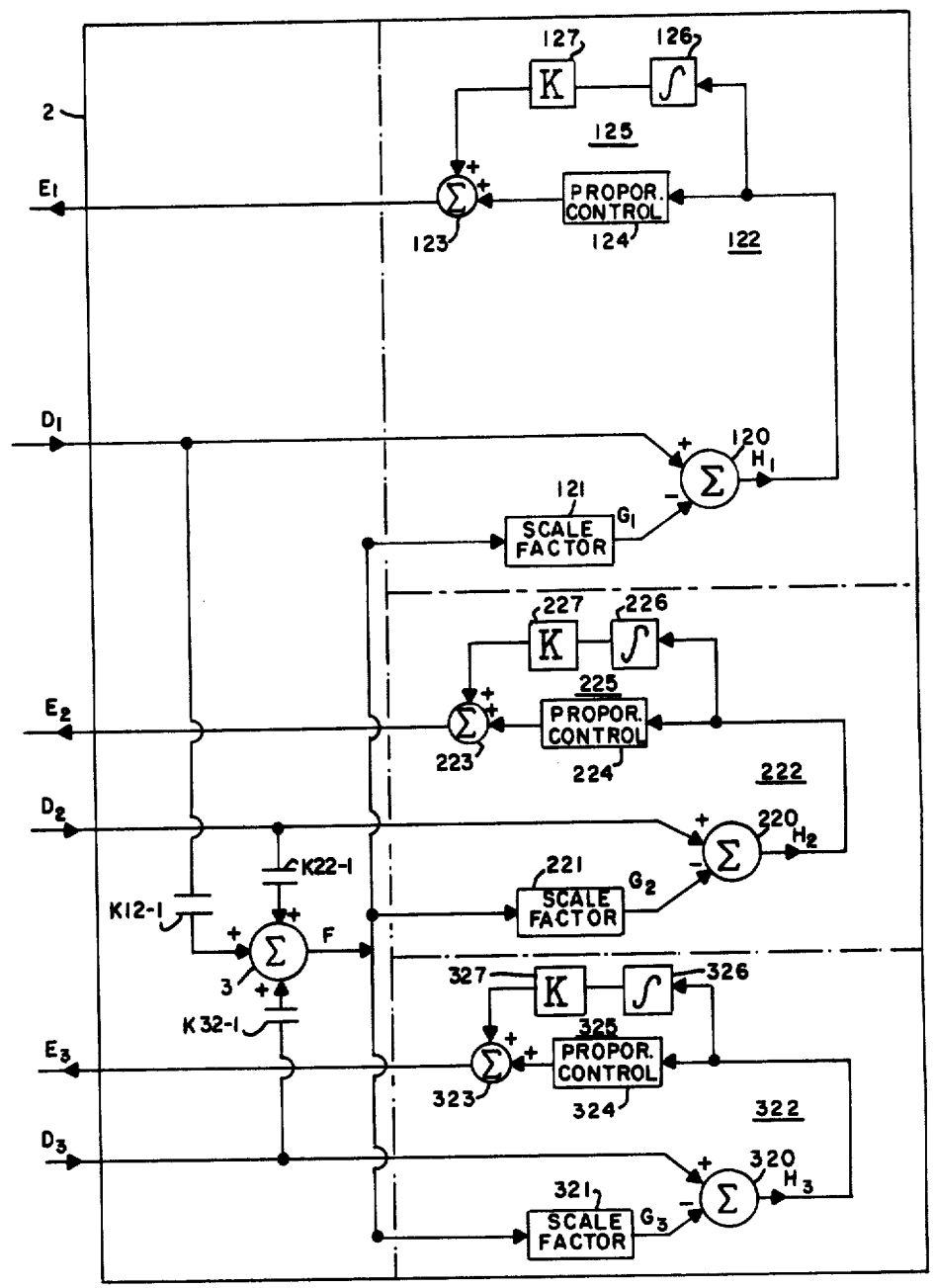
FIG. 2 is a schematic block diagram of one embodiment of a load management control.

Referring to FIG. 2, details of a suitable load management control 2 are disclosed. Each of output signals D1, D2, and D3 is applied to summing junction 3 through logic controlled relay contacts K12-1, K22-1, and K32-1, respectively, each of which is normally closed when a respective turbine-driven system is operating, and also to summing junctions 120, 220, and 320, respectively. Output signals D1, D2, and D3 are algebraically added in summing junction 3 and a combined output signal F proportional to the combined outputs of all three turbine-driven systems is generated. Combined output signal F is applied to each of scale factors 121, 221, and 321, the outputs of which are scaled, inverted, combined output signals G1, G2, and G3, respectively, each having a polarity of opposite sense to signals D1, D2, and D3. Each of output signals G1, G2, and G3 is algebraically added with output signals D1, D2, and D3, respectively, in summing junctions 120, 220, and 320, respectively, and second, or output, error signals H1, H2, and H3, respectively, are generated. Each of the second error signals H1, H2, and H3 is proportional to any deviation of the output signal of a respective turbine-driven system from a scaled portion of the combined outputs.

Generally, the turbine-driven systems are rated equally as to output and, accordingly, scale factors 121, 221, and 321 are made equal. In the situation of equally sharing the combined outputs, each turbine-driven system will provide an average portion of the combined total. However, load-sharing between the plurality of turbine-driven systems can be established for any particular proportions by selecting appropriate scale factors where the sum of the scale factors represents 100% of the combined outputs, and each individual scale factor represents any selected complementary portion of the total.

Output error signals H1, H2, and H3 are each applied to similar proportional-plus-integral compensation circuits 122, 222, and 322, respectively. Due to the fact that these compensation circuits are electrically and functionally identical, only circuit 122 will be further described in detail. Second error signal H1 is applied to summing junction 123 through proportional control channel 124 and also through integral control channel 125 comprising serially connected integrator 126 and multiplier 127 which integral control channel 125 is connected in parallel with proportional control channel 124. Proportional control channel 124 acts as an active gain compensation circuit and is determined in accordance with the dynamic operating conditions of the apparatus for generating a signal responsive to any transient differences contained in output error signal H1. During steady-state operation of the plurality of turbine-driven systems, the output from proportional control channel 124 to summing junction 123 is zero. However, the output of the integral control channel 125 is a non-zero value during steady-state operation. The time constant of integrator 126 is selected to be sufficiently long so as not to be affected by transient disturbances. The gain of multiplier 127 is selected to provide an output of suitable magnitude for steady-state operation. The integral control channel 125 generates a signal responsive to any steady-state differences contained in the output error signal H1. Compensation circuit 122, and similarly circuits 222 and 322, can be replaced with a proportional control channel only in which case there will be some tolerable steady-state error between the outputs of the various turbines in the installation. The output signals generated by summing junction 123, and similarly summing junctions 223 and 323, are the second error signals E1, E2, and E3, respectively, which are compensated for dynamic response.

Figure 3:
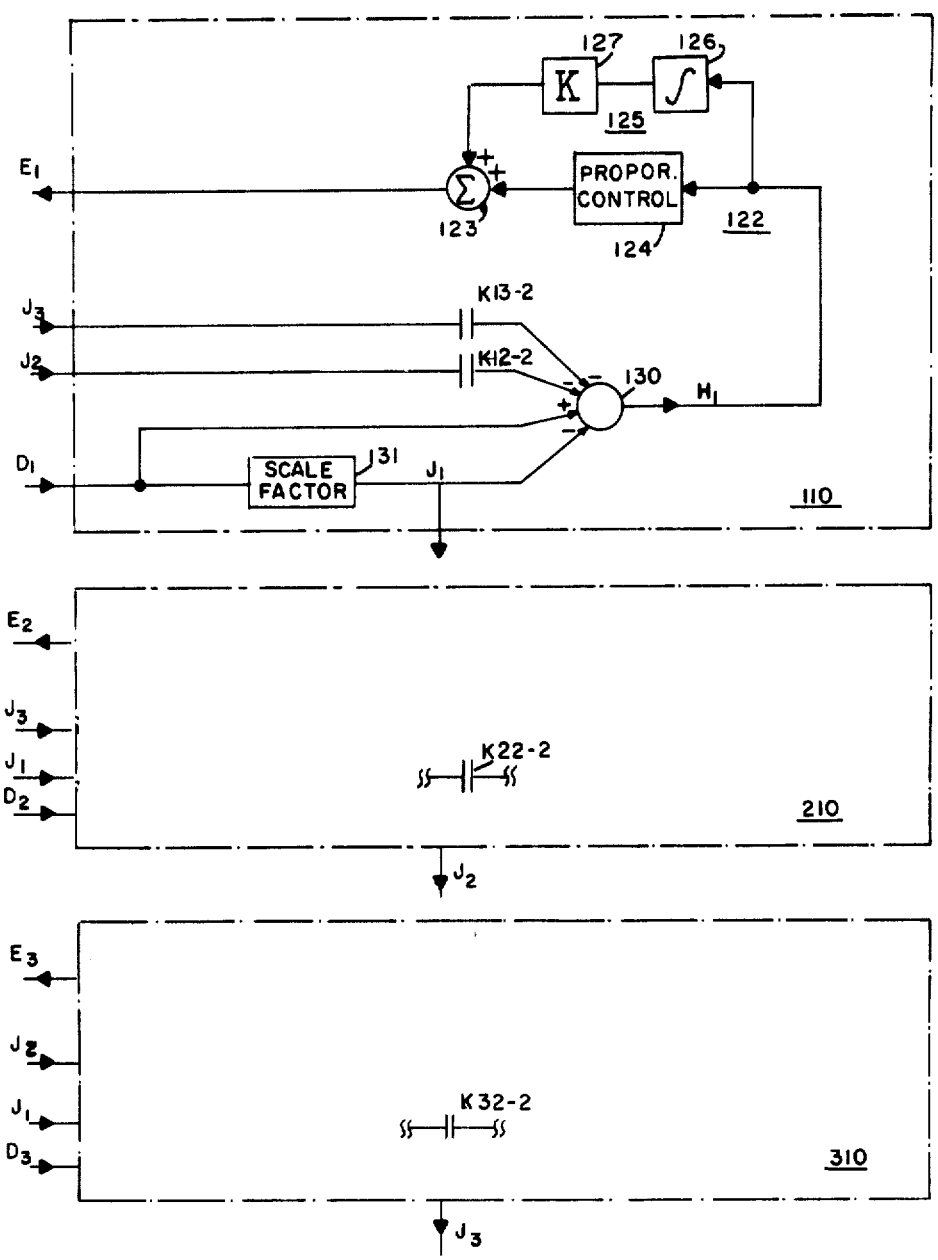
FIG. 3 is a schematic block diagram of an alternative embodiment of a load management control.

FIG. 3 illustrates an alternative load management control 2. Each of the dash line enclosures 110, 210, and 310 represents a unit of load management control 2. Inasmuch as the control units 110, 210, and 310 can be essentially alike, in both construction and operation, only the control unit 110 for turbine-driven system 100 is shown and described in detail, and control units 210 and 310 are assumed, for purposes of discussion, to be essentially identical in construction and operation to control unit 150. The control units 110, 210, and 310 receive output signals D1, D2, and D3, respectively. In control unit 110, output signal D1 is applied to summing junction 130 and also to a scale factor 131. The output signal of scale factor 131 is a scaled signal J1 having a value of output signal D1 divided by the number of turbine-driven systems selected from those included in the installation for inclusion in the load-sharing. Inasmuch as scale factor 131 divides output signal D1 by the number of participating equally-rated systems, equal load sharing is provided. However, where non-equally-rated turbine-driven systems are used, corresponding non-equal apportioning of the total installation load must be provided for. For example, in addition to the described structure and operation of scale factor 131, scale factor 131, and similarly the corresponding scale factors of control units 210 and 310, can include suitable circuitry for appropriately additionally scaling output signals D1, D2, and D3 to account for the different outputs to be provided by each turbine-driven system. It is preferable, however, to include in each second system-output sensor, flow sensor 108 for example, a suitble scale factor proportional to the output rating of its respective turbine-driven system such that output signals D1, D2, and D3 are equal in magnitude when turbine-driven system is providing its required load share. Signal J1 is applied to summing junction 130 and also to control units 210 and 310. Similarly, scaled signals J2 and J3 of control units 210 and 310, respectively, are also applied to summing junction 130 in control unit 110 through logic-controlled relay contacts K12-2 and K13-2, respectively, which contacts are normally closed during operation. Summing junction 130 algebraically adds output signal D1 in one sense to signals J1, J2, and J3 and in an opposite sense for generating output error signal H1. As described above in reference to FIG. 2, error signals H1, H2, and H3 of control units 110, 210, and 310, respectively, are applied to compensation circuits 122, 222, and 322 therein for generating second error signals E1, E2, and E3 respectively.

Figure 4:
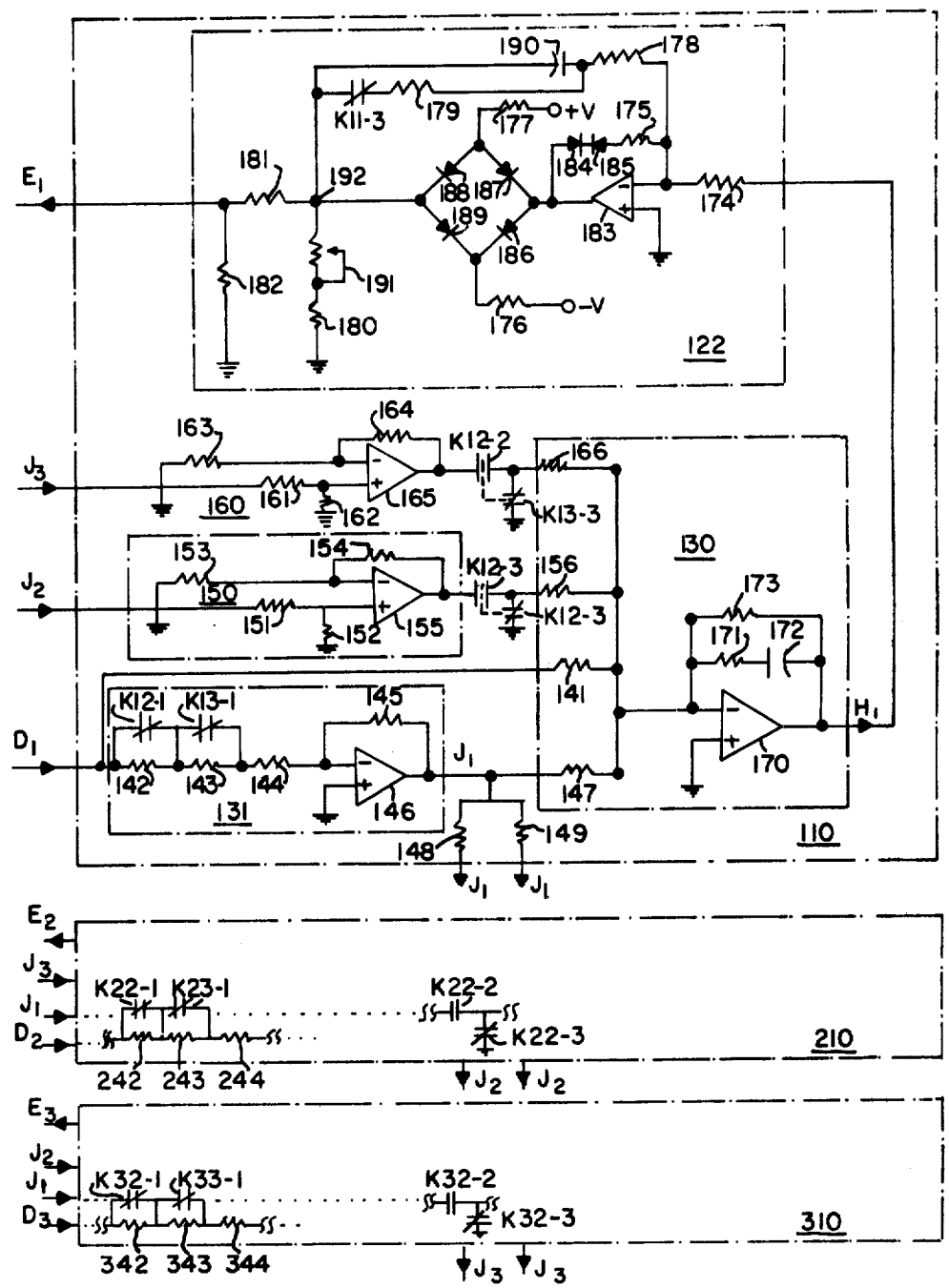
FIG. 4 is a schematic circuit diagram illustrating the load management control embodiment shown in FIG. 3.

FIG. 4 illustrates a circuit corresponding to the schematic of FIG. 3. Scale factor 131 comprises identical resistors 142, 143, and 144, resistor 145, relay contacts K12-1 and K13-1, and operational, or voltage difference, amplifier 146. Output signal D1 is applied to a resistor 141 and also to resistor 142, which resistor 142 is serially connected to both resistors 143 and 144 and to the negative input terminal of amplifier 146. The positive input terminal of amplifier 146 is connected to ground. Relay contacts K12-1 and K13-1, which are normally open during operation, are connected in parallel around resistors 142 and 143, respectively. Resistor 145 is connected in parallel feedback around amplifier 146 to the negative input terminal and the output terminal thereof at which output terminal scaled signal J1 is generated. Signal J1 is applied to each of resistors 147, 148, and 149. The purpose of resistors 148 and 149 is to provide information of the value of signal J1 to control units 210 and 310, respectively. Similarly, scaled signals J2 and J3 from control units 210 and 310, respectively, are applied to identical ground noise minimizing circuits generally indicated at 150 and 160, respectively, for minimizing undesirable interference in the signal levels. Inasmuch as noise minimizing circuits 150 and 160 are identical, only circuit 150 will be described in detail.

Circuit 150 comprises resistors 151, 152, 153, and 154, and differential amplifier 155. In the application of noise isolation circuitry of this type, it is desirable to have the values of all resistors be of the same value. Signal J2 is applied to the positive input terminal of amplifier 155 through resistor 151, which terminal is also connected to ground through resistor 152. The negative input terminal of amplifier 155 is connected to ground through resistor 153 and also to the output terminal of amplifier 155 through feedback resistor 154. The output terminals of amplifier 155, and similarly of amplifier 165 of noise circuit 160, are connected to relay contacts K12-2, K13-2, respectively, which contacts are each connected to resistor 156 and relay contacts K12-3, and resistor 166 and relay contacts K13-3, respectively. Relay contacts K12-3 and K13-3 are each connected to ground. During operation, relay contacts K12-2 and K13-2 are normally closed, and relay contacts K12-3 and K13-3 are normally open.

The summing junction designated 130 in FIG. 3 is a network of elements comprising resistors 141, 147, 156, 166, 171, and 173; capacitor 172; and operational amplifier 170 all indicated generally at 130 in FIG. 4. This arrangement of elements provides stability compensation as well as summing signals J1, J2, J3, and D1. Resistors 141, 147, 156, and 166 are each connected to the negative input terminal of amplifier 170. This negative input terminal is connected also to the output terminal of amplifier 170 through resistor 173 and serially connected resistor 171 and capacitor 172, which resistor 171 and capacitor 172 are connected in parallel with resistor 173. The positive terminal of amplifier 170 is connected to ground.

When equal load-sharing is desired and resistors 141, 147, 156, and 166 are all set at a common value, the output signal H1 of amplifier 170 is a value which is proportional to the output of turbine-driven system 100 minus a value which is equal to the combined output of all turbine-driven systems contributing to the total system output divided by the number of turbine-driven systems selected for load-sharing. The signal H1 represents a difference between the output of turbine-driven system 100 and the average combined system output which is indicative of the amount of correction which must be made to the output of turbine-driven system 100 in order to achieve equalization of the combined outputs among all turbine-driven systems participating. The value of signal H1 can be a positive or negative value depending on whether the output of turbine-driven system 100 is to be increased or decreased in order that equal sharing of the combined load be realized.

The output terminal of amplifier 170 is connected to the negative terminal of an operational amplifier 183 through resistor 174 of proportional-plus-integral compensation circuit 122 which circuit comprises resistors 174, 175, 176, 177, 178, 179, 180, 181, and 182; operational amplifier 183; diodes 184 and 185; a diode assembly comprising diodes 186, 187, 188, and 189; capacitor 190; relay contacts K11-3 which are normally open during operation; and potentiometer 191. The positive input terminal of amplifier 183 is connected to ground. The negative input terminal of amplifier 183 is additionally connected to one end of both resistors 175 and 178. The opposite side of resistor 175 is connected to an anode of voltage-limiting diode 185, the cathode thereof being connected to the cathode of diode 184. The anode of diode 184 is connected to the output terminal of amplifier 183, and to the anode and cathode of diodes 186 and 187, respectively, of the diode assembly. The anode of diode 187 is connected to the anode of diode 188 and also to a voltage supply source through resistor 177. The cathode of diode 186 is connected to the cathode of diode 189, and also to a negative voltage supply source through resistor 176. The anode and cathode of diodes 189 and 188, respectively, are both connected to an electrical junction 192.

The opposite end of resistor 178 is connected to an end of capacitor 190 and to junction 192 through serially connected resistor 179 and relay contacts K11-3. The opposite end of capacitor 190 is also connected to junction 192. Junction 192 is connected to ground through serially connected potentiometer 191 and resistor 180. Junction 192 is also connected to resistor 181 which resistor 181 is connected to ground through resistor 182 and to summing junction 109 of turbine-driven system 100 through relay contacts K11-1 for applying a compensated second error signal E-1 thereto, when relay contacts K11-1 are closed.

The compensation circuitry comprises an integrator for providing more exact steady-state load-sharing between the coordinated systems and a phase compensation lead circuit for stability considerations. When a proportional-plus-integral compensation circuit as above-described is utilized, it is desirable to limit the amount of charge accumulated by capacitor 190 in order to minimize reset time. When turbine-driven system 100 is in a manual control mode and load-sharing with the other turbine-driven systems is not required, relay contacts K11-3 are closed and a path is provided for conveniently discharging or resetting capacitor 190. Diodes 184 and 185 and resistor 175 are provided to control the potential at the input of amplifier 183 when turbine-driven system 100 participates in the load-sharing.

Figure 5:
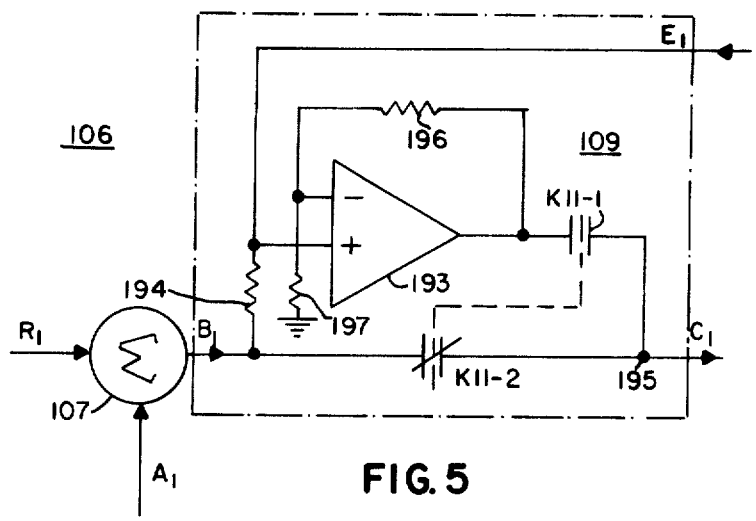
FIG. 5 is a representative schematic diagram illustrating means for generating a control signal.

FIG. 5 illustrates a representative means for generating control signals. Shown is circuitry for summing means 106 of turbine-driven system 100. Identical circuitry (not shown) is provided for means 206 and 306 of turbine-driven systems 200 and 300, respectively. Summing means 106 further comprises summing junction 107 and summing junction 109 as indicated generally at 109. Output error signal E1 from control unit 110 is applied to the positive input terminal of an operational amplifier 193. Speed error signal B1 from summing junction 107 is applied to the positive terminal of amplifier 193 through resistor 194, and to electrical junction 195 through relay contacts K11-2, which contacts are normally open during operation. The negative input terminal of amplifier 193 is connected to ground through a resistor 197 and to the output terminal of amplifier 193 through feedback resistor 196, which output terminal is connected to junction 195 through relay contacts K11-1 which are normally closed during operation. The junction 195 is connected to the electrical control 102 of turbine-driven system 100 for providing control signal C1.

Figure 6:
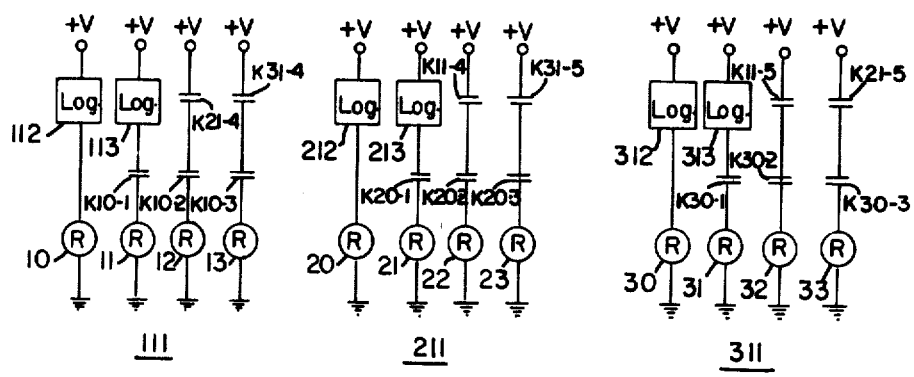
FIG. 6 is a representative schematic diagram of logic-controlled relays for turbine-driven systems of the type shown in FIG. 1.

FIG. 6 illustrates a representative arrangement of logic circuitry which can be used in the control apparatus of the invention. Other arrangements of logic circuitry which can be used will become apparent to those skilled in the art after having considered the circuitry disclosed herein. Shown is the logic circuitry associated with turbine-driven system 100 and indicated generally at 111. Identical logic circuitry 211 and 311 is provided for turbine-driven systems 200 and 300, respectively. Inasmuch as the logic circuitry for the several turbine-driven systems is identical, only logic circuitry 111 will be further described in detail; noted, however, will be the interconnections of logic circuitry 111 with circuitry of the other systems.

The logic circuitry 111, for use in a three turbine-driven system installation comprises electrical relays 10, 11, 12, and 13. Similarly, logic circuitry 211 and 311 comprise relays 20, 21, 22, and 23; and 30, 31, 32, and 33, respectively.

Relay 10 comprises a relay coil (not shown), one terminal of which is connected to a voltage supply source through a logic circuit 112, and the opposite terminal of which is connected to ground. Relay 10 further comprises relay contacts K10-1, K10-2, and K10-3, which contacts are normally closed during operation, and each of which controls the energizing of each of the other relays 11, 12, and 13, respectively. Contacts K10-1 are serially connected to and between one terminal of the relay coil of relay 11, the opposite terminal of which is connected to ground, and to logic circuit 113 which is connected to a voltage supply source. Relay contacts K10-2 are serially connected to and between one terminal of the relay coil of relay 12, the opposite terminal of which is connected to ground, and to auxiliary relay contacts K21-4 which are connected to a voltage supply source. Relay contacts K10-3 are serially connected to and between one terminal of the relay coil of relay 13, the opposite terminal of which is connected to ground, and to auxiliary relay contacts K31-4, which are connected to a voltage supply source.

Relay 11 further comprises relay contacts K11-1, K11-2, and K11-3, which contacts are connected as previously described with respect to FIGS. 4 and 5, and auxiliary relay contacts K11-4 and K11-5, which are normally closed during operation. Auxiliary relay contacts K11-4 and K11-5 are provided for indicating, when closed, to each of the other of the plurality of turbine-driven systems whether turbine-driven system 100 is participating in load-sharing. Relay contacts K11-4 are connected to relay 22 of logic circuitry 211 and relay contacts K11-5 are connected to relay 32 of logic circuitry 311 in a similar manner as are relay contacts K21-4 to relay 12 of logic circuitry 111. Similarly, relays 21 and 31 of logic circuitry 211 and 311, respectively, provide auxiliary relay contacts K21-4 and K21-5, and K31-4 and K31-5, respectively, for indicating, when closed, whether turbine-driven systems 200 and 300, respectively, are participating in load-sharing. Relay contacts K21-4 and K31-4 are connected in logic circuitry 111 as above-described and as shown in FIG. 6. Relay contacts K21-5 and K31-5 are connected to relays 33 and 23, respectively, in a similar manner as are relay contacts K31-4 to relay 13 of logic circuitry 111.

Relay 12 further comprises electrical contacts K12-1, K12-2 and K12-3 as previously described with respect to scale factor 131 and noise minimizing circuit 150, and is energized when both contacts K10-2 and auxiliary electrical contacts K21-4, from relay 21, are closed.

Relay 13 further comprises electrical contacts K13-1, K13-2, and K13-3 as previously described with respect to scale factor 131 and noise minimizing circuit 160, and is energized when both contacts K10-3 and auxiliary electrical contacts K31-4, from relay 31, are closed.

The above-described control apparatus is effective for implementing a method for sharing the combined outputs of a plurality of turbine-driven systems each producing an output proportional to a respective control signal. The method comprises the steps of generating a first error signal in each of the turbine-driven systems proportional to any deviation of a predetermined first system-output indicating parameter from a predetermined reference value therefor. Furthermore, a second error signal is generated in each of said turbine-driven systems proportional to any deviation of a predetermined second system-output indicating parameter from a respective complementary portion of combined second system-output indicating parameters of the systems. Finally, a control signal is generated in each of said turbine-driven systems proportional to respective first and second error signals for controlling the output of each of the systems whereby a predetermined relationship of the individual output of the turbine-driven systems is maintained.

More specifically, during operation, all of the plurality of turbine-driven systems are generally electrically connected into the control apparatus for load-sharing, by energizing relays 10, 11, 12, and 13; 20, 21, 22, and 23; and 30, 31, 32, and 33, therein for effecting load-sharing. For instance, logic circuit 112 of turbine-driven system 100 causes relay 10 to energize and thereby close relay contacts K10-1, K10-2, and K10-3. Logic circuit 113 then allows relay 11 to energize. Similarly, relays 21 and 31 are energized thereby closing relay contacts K21-4 and K31-4 and thus causing relays 12 and 13 to be energized.

The external control means generates respective speed reference values for each turbine-driven system, which when combined with actual speed signals in the respective summing junctions thereof results in the generation of first error signals B1, B2, and B3.

Relay contacts K12-1 and K13-1, which are open during operation, cause the output signal D1 to be divided by the total number of turbine-driven systems, in this case three, which is due to the series connection of resistors 142, 143, and 144 in scale factor 131. Output signals H1, and similarly H2 and H3 of summing junctions 130, 230, and 330, respectively, represent output error signals indicative of the individual turbine-driven system outputs D1, D2, and D3, respectively, minus an average of the combined values thereof. The output error signals are each dynamically compensated for providing compensated output error signals E1, E2, and E3, respectively, for combining with respective first error signals for producing control signal C1, C2, and C3 in turbine-driven systems 100, 200, and 300, respectively.

Any of the plurality of turbine-driven systems can be operated in a manual mode so as to be isolated from participating in the load-sharing. This is accomplished by having logic circuit 112 de-energize relay 10, for instance. Relay contacts K10-1, K10-2, and K10-3 will thereby open to de-energize relays 11, 12, and 13. More specifically, the de-energizing of relay 11 causes relay contacts K11-1, K11-4, and K11-5 to open and relay contacts K11-2 and K11-3 to close. Opening contacts K11-1 and closing contacts K11-2 provides a direct electrical path for conducting the first error signal B1 from summing junction 107 to electrical control 102 to provide the control signal C1 to turbine-driven system 100. Closing contact K11-3 discharges capacitor 190. Opening contacts K11-4 and K11-5 indicates to logic circuitry 211 and 311 that turbine-driven system 100 is not participating in load-sharing.

Although turbine-driven system 100 may be operated in a manual mode and thus not participate in the load-sharing, turbine-driven systems 200 and 300 continue to participate. In this situation, the external control means above-mentioned determines whether the remaining turbine-driven systems are to share the total system requirement, where they have sufficient reserve capacity therefor, or a selected proportional share of the total system requirement. In either case, new speed reference signals are provided in turbine-driven systems 200 and 300. In the situation where they are to share the load equally, or 50% each, the scale factors therein must be adjusted to a 50% value instead of a 33⅓% value when all three turbine-driven systems are participating. Due to the fact that relay 11 of turbine-driven system 100 is in a de-energized state, auxiliary relay contacts K11-4 and K11-5 are open. Opening relay contacts K11-4 and K11-5 causes relays 22 and 32 of turbine-driven systems 200 and 300, respectively, to deenergize, thus closing the relay contacts K22-1 and K32-1 therein and providing a bypass path around resistors 242 and 342 included in control units 210 and 310, respectively. Output signals D2 and D3 in control units 210 and 310, respectively, will each be conducted only through resistors 243 and 244, and 343 and 344, respectively. This has the effect of dividing each signal by the value 2 for effecting equal load-sharing.

De-energizing relays 22 and 32 also causes contacts K22-2 and K32-2, respectively, to open and contacts K22-3 and K32-3, respectively, to close, thereby electrically isolating turbine-driven system 100 from the control apparatus and preventing scaled signal J1 from entering summing junctions 230 and 330 through noise circuits 250 and 350 in control units 210 and 310, respectively. Output signals H2 and H3, therefore, are proportional only to signals D2 and D3, signal D1 being prevented from affecting the load-sharing.

It is apparent from the above description of operation of the control apparatus that all three or any two of the three turbine-driven systems can be selected for participating in load-sharing by causing respective logic circuits 112, 212, or 312 to energize relays 10, 20, or 30, respectively. Also, by causing relays 10, 20, and 30 to remain de-energized, each turbine-driven system 100, 200, and 300, respectively, can be operated in a manual mode of operation and thereby not participate in load-sharing.

Finally, logic circuit 113 is provided for de-energizing relay 11, by removing the voltage thereto, to effect discharging of capacitor 190, for example.

It will be appreciated by those skilled in the art that the control apparatus and method of this invention can be utilized for coordinating the operation of any number of turbine-driven systems by providing in each a control unit, such as control unit 150, and logic circuitry such as logic circuitry 111, in a multi-turbine installation arrangement, such as shown in FIG. 1.

More specifically, each logic circuitry would comprise identical relay contacts K10-2, K10-3, K10-4, etc., for controlling relays 12, 13, 14, etc., for 2,3,4 and any other number of turbine-driven systems installation, respectively. Relay 11 would accordingly comprise relay contacts K11-4, K11-5, K11-6, etc., each to be located in the logic circuitry of respective turbine-driven systems for controlling relays 12, 13, 14, etc., respectively. Relays 12, 13, 14, etc., would comprise appropriate relays for use in control units 110, 210, 310, 410, etc. The scale factor of each control unit would comprise an electrical contact pair in parallel with a resistor, such as contacts K12-1 and resistor 142 in scale factor 131, for each turbine-driven system over 1, all serially interconnected as above-described and shown in FIG. 4 and each contact pair being controlled by a respective relay 12, 13, 14, etc. Finally, a noise minimizing circuit such as noise minimizing circuit 150, and electrical contacts associated therewith would be provided for each scaled signal J2, J3, J4, etc., from respective control units, for summing in summing junction 130, for instance.

Figure 1A:
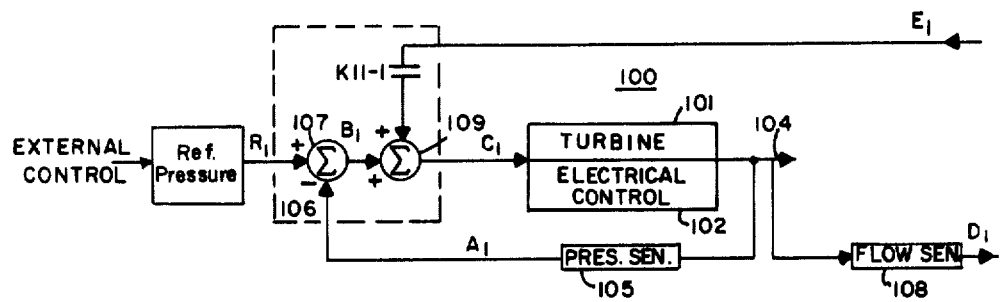
FIG. 1a is a schematic block diagram of an alternative turbine-driven system comprising the pressure control loop for a single automatic extraction turbine power equipment.

One alternative multi-turbine installation comprises a single automatic extraction turbine providing steam for powering common equipment and other purposes. In this situation, and as illustrated in FIG. 1a for turbine-driven system 100, the electrical control 102 associated with turbine-driven system 100 comprises a rotor speed and pressure control system and the first system-output indicating parameter is pressure-sensed by pressure sensor 105. A pressure error signal B1 is used for generating a control signal C1 for controlling a servo-valve (not shown) which supplies steam flow 104 to power common equipment or processes (not shown) which require steam. The second system-output indicating parameter is actual steam flow to the equipment as controlled by the servo-valve. Load management control 2 receives output signals D1, D2, and D3 indicative of the actual amount of steam supplied to the common equipment and generates output error signals E1, E2, and E3 for coordinating the operation of the turbine-driven systems for effecting load-sharing.

Figure 1B:
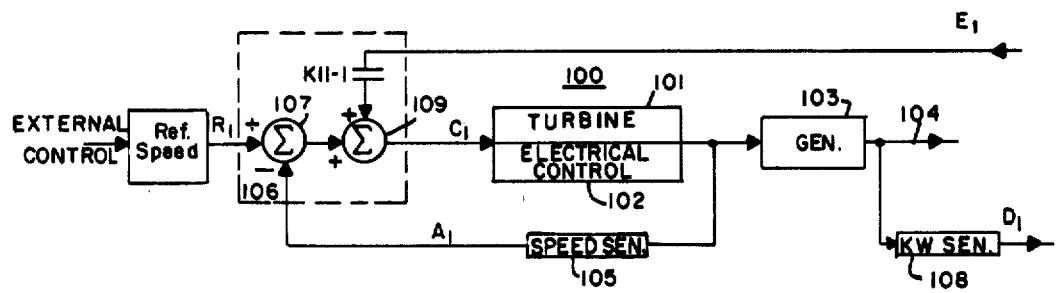
FIG. 1b is a schematic block diagram of an alternative turbine-driven system comprising a turbine generator set.

Another alternative multi-turbine installation comprises turbine-generator sets which provide electrical output power. In this situation, and as illustrated in FIG. 1b for turbine-driven system 100, the electrical control 102 associated with each turbine-driven system comprises a rotor speed control system such as in the turbine pump arrangement as above-described. The second system-output indicating parameter is the electrical output of the generator expressed in kilowatts. In this turbine-driven system embodiment, when any one unit is tripped, the electrical load being supplied by the multi-turbine installation continues to exist and may be supplied by the remaining turbine-driven systems. If the remaining turbine-driven systems have sufficient reserve capacity to combinedly meet the total load, no correction of speed reference signals is required. The electrical load acting on the generators will tend to cause the turbine to decrease its speed. The electrical control of each turbine-driven system will accordingly cause additional steam to be supplied to power each turbine to offset any tendency of the turbine to decrease speed. Simultaneously, the load management control 2 assures that the load is properly divided.

While there have been described herein what are considered to be the preferred embodiments of the invention, other modifications will occur to those skilled in the art, and it is desired to secure by the appended claims all modifications falling within the true spirit and scope of this invention.

What is claimed is:

1. In a control apparatus for a multi-turbine installation, the combination comprising:
a plurality of turbine-driven systems, each producing an output proportional to a respective control signal;
means for generating a respective first error signal for each of said turbine-driven systems and proportional to any deviation of a respective first system-output indicating parameter from a respective predetermined reference value therefor;
means for generating a respective second error signal for each of said turbine-driven systems and proportional to any deviation of a respective second system-output indicating parameter from a respective complementary portion of the combined second system-output indicating parameters of said systems; and
means for generating the respective control signal for each of said turbine-driven systems and proportional to the sum of respective ones of said first and second error signals,
whereby a predetermined relationship of the individual outputs of said turbine-driven systems is maintained.

2. The control apparatus of claim 1, wherein each of said turbine-driven systems comprises a turbine-pump set, said means for generating a first error signal provides a signal proportional to any difference between an actual rotor speed and a demand level rotor speed of said set, and said means for generating a second error signal provides a signal proportional to any difference between actual pump volume output of said set and the average of the combined pump volume outputs of a plurality of turbine pump sets.

3. The control apparatus of claim 1, wherein each of said turbine-driven systems comprises a single automatic extraction turbine providing extraction steam, said means for generating a first error signal provides a signal proportional to any difference between an actual extraction steam pressure and a demand level extraction steam pressure of said set, and said means for generating a second error signal provides a signal proportional to any difference between actual extraction steam flow output of said turbine and the average of the combined extraction steam flow outputs of a pluratlity of turbines.

4. The control apparatus of claim 1, wherein each of said turbine-driven systems comprises a turbine-generator set, said means for generating a first error signal provides a signal proportional to any difference between an actual rotor speed and a demand level rotor speed of said set, and said means for generating a second error signal provides a signal proportional to any difference between actual generator kilowatt output of said set and the average of the combined generator kilowatt outputs of a plurality of sets.

5. The control apparatus of claim 1, wherein said means for generating a respective second error signal further comprises:

an output sensor for each turbine-driven system for generating a second system-output signal proportional to the output of said system;

means for generating an average output signal proportional to an average of the combined second system-output signals of said systems;

means for obtaining the difference of said average output signal from each said second system-output signals for providing the respective second error signals; and means for compensating said respective second error signals for enhancing the dynamic characteristics of the control signals.

6. The control apparatus of claim 5, wherein said means for compensating the respective second error signals each comprises:

a proportional control channel for generating a signal responsive to any transient differences between said second system-output signals of the plurality of turbine-driven systems contained in said second error signal;

an integral control channel for generating a signal responsive to any steady-state differences between said second system-output signals of the plurality of turbine-driven systems contained in said second error signal; and means for summing the signals from said proportional control channel and said integral control channel to effect said compensation of said second error signal.

7. The control apparatus as recited in claim 1, further comprising logic-controlled switching means effective for determining the number of said turbine-driven systems within said plurality included for sharing combined outputs, electrically connecting each included turbine-driven system to said control apparatus, and electrically isolating each of those turbine-driven systems to be excluded therefrom.

8. A method for sharing the combined outputs of a plurality of turbine-driven systems each providing an output proportional to a respective control signal comprising the steps of:

generating a first error signal in each of said turbine-driven systems proportional to any deviation of a predetermined first system-output indicating parameter from a predetermined reference value therefor;

generating a second error signal in each of said turbine-driven systems proportional to any deviation of a predetermined second system-output indicating parameter from a respective complementary portion of combined second system-output indicating parameters of said systems; and generating a control signal in each of said turbine-driven systems proportional to respective first and second error signals for controlling the output of each said systems, whereby a predetermined relationship of the individual output of said turbine-driven systems is maintained.

* * * * *